United States Patent [19]

Fischer et al.

[11] Patent Number: 5,159,000
[45] Date of Patent: Oct. 27, 1992

[54] AQUEOUS POLYMER FORMULATIONS

[75] Inventors: Karl Fischer, Bad Duerkheim; Petert Weyland, Frankenthal, both of Fed. Rep. of Germany

[73] Assignee: BASF Aktiengesellschaft, Ludwigshafen, Fed. Rep. of Germany

[21] Appl. No.: 630,194

[22] Filed: Dec. 19, 1990

[30] Foreign Application Priority Data

Jan. 16, 1990 [DE] Fed. Rep. of Germany ....... 4000976

[51] Int. Cl.$^5$ .......................... C08K 5/53; C08L 33/08
[52] U.S. Cl. .................................... 524/127; 524/198; 524/560; 524/561
[58] Field of Search ................ 524/560, 561, 127, 198

[56] References Cited

U.S. PATENT DOCUMENTS 4,017,662 4/1977 Geshman ............................ 428/443

FOREIGN PATENT DOCUMENTS

| | | |
|---|---|---|
| 0100493 | 2/1984 | European Pat. Off. . |
| 1811247 | 7/1969 | Fed. Rep. of Germany . |
| 2645779 | 4/1978 | Fed. Rep. of Germany . |
| 133099 | 6/1978 | Fed. Rep. of Germany . |
| 3324479 | 1/1985 | Fed. Rep. of Germany . |
| 3610576 | 10/1987 | Fed. Rep. of Germany . |
| 2015280 | 6/1960 | France . |
| 1254294 | 11/1971 | United Kingdom . |

OTHER PUBLICATIONS

Patent Abstracts of Japan, vol. 10, No. 345 (C-386) (2401) Nov. 20, 1986.
JP-A-61 148273 (Yuuhoo Chem KK), Jul. 4, 1989.
Patent Abstracts of Japan, vol. 13 No. 442 (C-641) (3790) Oct. 4, 1989.
JP-A-1 168763 (Rinrei KK) Jul. 4, 1989.

*Primary Examiner*—Joseph L. Schofer
*Assistant Examiner*—Jeffrey T. Smith
*Attorney, Agent, or Firm*—Oblon, Spivak, McClelland, Maier & Neustadt

[57] ABSTRACT

Aqueous polymer formulations contain one or more polymers, external plasticizers, effective amounts of emulsifiers and, if necessary, natural and/or synthetic waxes and are suitable as binders on leather.

6 Claims, No Drawings

AQUEOUS POLYMER FORMULATIONS

The present invention relates to aqueous polymer formulations containing a) from 5 to 60% by weight of one or more polymers consisting of
   A) from 50 to 100% by weight of one or more polymers A in polymerized form, composed of from 20 to 80% by weight of one or more esters of methacrylic acid with alkanols of 1 to 8 carbon atoms (monomers I), from 0.5 to 10% by weight of one or more $\alpha,\beta$-monoethylenically unsaturated carboxylic acids of 3 to 6 carbon atoms (monomers II) and from 10 to 75% by weight of one or more monomers from the group consisting of esters of acrylic acid with alkanols of 1 to 8 carbon atoms, acrylonitrile, acrylamide, methacrylamide, styrene and N-methylolmethacrylamide (monomers III),
   B) from 0 to 50% by weight of one or more polymers B in polymerized form, composed of from 30 to 98% by weight of one or more esters of acrylic acid with alkanols of 1 to 8 carbon atoms (monomers IV), from 1 to 8% by weight of one or more $\alpha,\beta$-monoethylenically unsaturated carboxylic acids of 3 to 6 carbon atoms (monomers V) and from 1 to 65% by weight of monomers from the group consisting of acrylonitrile, acrylamide, methacrylamide, styrene, vinyl chloride and vinyl acetate (monomers VI), and
   C) from 0 to 50% by weight of one or more polyurethanes C containing hydrophilic groups, with the proviso that the sum of B and C is from 0 to 50% by weight, based on the total amount of the polymer a),
b) from 0.1 to 14% by weight, based on the total amount of the polymers A, B and C, of external plasticizers W,
c) from 0 to 20% by weight, based on the total amount of polymers A, B and C, of natural and/or synthetic waxes,
d) effective amounts of emulsifiers E and
e) not less than 30% by weight of water.

The present invention furthermore relates to a process for the preparation of these aqueous formulations and the use of the said formulations as binders for coating leather or leather replacement materials, such as leather fiber materials, in particular for the final coat, ie. the season.

DE-A 36 10 576 discloses aqueous polymer dispersions whose polymers are composed of an alkyl acrylate, acrylic or methacrylic acid, if necessary methyl methacrylate, acrylonitrile and if required further comonomers which do not have acidic, basic or crosslinking groups, and which are prepared in the presence of certain amounts of organic peroxo compounds and certain amounts of anionic emulsifiers, preferably with the use of nonionic emulsifiers. These aqueous polymer dispersions are recommended as binders for coating leather, including for the season. However, the disadvantage of these aqueous dispersions is that the presence of epoxide and aziridine crosslinking agents is necessary in order to achieve high wet and dry rub fastnesses of the coated leathers. The rub fastness is defined as the resistance of the coated leather surface to rubbing.

EP-B 100 493 discloses a process for the surface treatment of leather or leather replacement material, in which an aqueous dispersion is used for the final coat, the said dispersion containing a dispersed polymer which contains, as polymerized units, from 20 to 40% by weight of styrene, from 50 to 75% by weight of one or more $C_1-C_6$-alkyl esters of acrylic and/or methacrylic acid, from 1 to 10% by weight of acrylic and/or methacrylic acid and from 1 to 5% by weight of N-methylolacrylamide and/or N-methylolmethacrylamide, the percentages being based on the polymer. However, the disadvantage of these aqueous dispersions is that they require the presence of divalent metal ions.

DE-A 18 11 247 relates to aqueous formulations which contain a leveling agent or a plasticizer, a wax, a wax-soluble and/or alkali-soluble resin, a wetting agent, emulsifier or dispersant, if necessary metal ions and emulsion copolymers composed mainly of alkyl acrylates. The formulations can be used, inter alia, for impregnating leather, but are preferred for polishing floors or furniture. However, the disadvantage of these formulations when used as binders for coatings on leather is their poor water resistance in the solidified state, a property which is desirable when the formulations are used for polishing floors or furniture.

It is an object of the present invention to provide aqueous formulations which are particularly suitable as binders for leather seasons having high wet and dry rub fastnesses, without the additional use of crosslinking agents or metal ions. We have found that this object is achieved by the aqueous polymer formulations defined at the outset.

Methyl methacrylate is of particular interest as monomer I and is preferably used as the sole monomer I, advantageously from 20 to 70, particularly preferably from 39 to 65, % by weight, based on the polymer A, of methyl methacrylate being polymerized in A. Preferred monomers II are acrylic and methacrylic acid. Particularly advantageous polymers A contain from 1 to 5% by weight of the monomers II. Particularly suitable monomers III are the acrylates of ethanol and of n-butanol, as well as styrene and acrylonitrile. The weight of the preferred monomers III in A is preferably from 34 to 60% by weight.

The presence of polymers B and/or C is preferred from the point of view of the performance characteristics. Aqueous formulations according to the invention which contain from 15 to 40% by weight, based on the total amount of polymer, of polymers B and/or of C are of particular interest. Particularly suitable monomers IV are ethyl acrylate and n-butyl acrylate, whereas acrylic and methacrylic acid are preferred monomers V. Particularly suitable monomers VI are acrylonitrile, styrene, acrylamide and methacrylamide.

The polyurethanes C are composed of the aliphatic, cycloaliphatic and/or aromatic organic isocyanates I which are known in polyurethane chemistry, polyols P and, if required, chain extenders K, and of one or more anionically ionized compounds S which, in addition to one or more groups which are reactive to isocyanate groups, contain one or more carboxylate and/or sulfonate groups as anionic functions, and, if required, one or more nonionic hydrophilic compounds N, the last-mentioned compounds having one or more groups which are reactive to isocyanate groups having terminal and/or side alkoxy groups within an ether chain.

The polyurethanes C preferably contain from $0.5 \cdot 10^{-4}$ to $15 \cdot 10^{-4}$, particularly preferably from $1 \cdot 10^{-4}$ to $8 \cdot 10^{-4}$, gram equivalent of anionically ionized groups per gram of polyurethane in the polymer, and from 0 to 10% by weight, based on the polyurethane, of ethylene oxide units arranged as terminal and/or side groups within ether chains. Polyisocyanates I which are particularly suitable for the synthesis of the polyurethanes C are hexane 1,6-diisocyanate, 1-isocyanato3,5,5-trimethyl-5-isocyanatomethylcyclohexane, 4,4'-diisocyanatodicyclohexylmethane, toluylene 2,4- and 2,6-diisocyanate and isomer mixtures thereof. Particularly suitable polyols P are polyhydroxypolyesters, polyhydroxycarbonates and polyhydroxyethers, which preferably carry only two terminal alcoholic hydroxyl groups and have a number average molecular weight of from 500 to 5,000. Particularly suitable chain extenders K are compounds which contain two or more hydrogen atoms reactive to isocyanate groups and which have a number average molecular weight of from 18 to 400, for example diols, such as ethylene glycol, 1,4-butanediol, 1,5-pentanediol, 1,6-hexanediol or neopentylglycol, diamines, such as 1,2-ethylenediamine, 1,6-hexamethylenediamine, isophoronediamine, piperazine or 4,4,-diaminodicyclohexylmethane, and polyamines having a valency of more than two, such as diethylenetriamine.

Alkali metal salts of aminocarboxylic or of aminosulfonic acids, such as the sodium salts of diaminocarboxylic acids, for example the adduct of 1,2-ethylenediamine and the sodium salt of acrylic acid, or diaminosulfonic acids and alkali metal salts of hydroxycarboxylic acids, such as the Na salt of dimethylolpropionic acid, are particularly suitable for incorporating anionic functions in the polyurethanes C. However, it is also possible to incorporate the acids themselves into the polyurethanes C and, after their incorporation, to convert them into the corresponding anionic functions by neutralization.

Particularly suitable compounds N are monovalent polyetherols which have a number average molecular weight $\overline{M}_n$ of from 500 to 10,000, preferably from 1,000 to 5,000, and are obtainable by alkoxylation of monohydric alkanols, such as methanol or n-butanol. Advantageously used alkoxylating agents are ethylene oxide or mixtures of ethylene oxide and other alkylene oxides, in particular propylene oxide, the mixtures containing not less than 40, preferably not less than 65, % by weight of ethylene oxide. Pure ethoxylation products are particularly preferred.

Since the novel aqueous formulations contain the polymers A and B in disperse form, the polymers A and B are advantageously prepared by polymerization of the particular monomers in an aqueous medium under the known conditions of emulsion polymerization in the presence of water-soluble free radical initiators and emulsifiers E and in the presence or absence of protective colloids, regulators and further assistants.

Emulsifiers E which have proven particularly useful are nonionic and anionic surfactants. Preferably used nonionic surfactants are ethoxylated alkanols having a degree of ethoxylation of from 6 to 50 and containing a $C_8$-$C_{18}$-alkyl radical, ethoxylated alkylphenols having a degree of ethoxylation of from 6 to 50 and containing a $C_8$-$C_{12}$-alkyl radical and ethoxylated aliphatic monocarboxylic acids having a degree of ethoxylation of from 6 to 50 and containing a $C_{12}$-$C_{18}$-alkyl radical. Preferably used anionic surfactants are the alkali metal salts of the sulfated derivatives of alkanols of 6 to 18 carbon atoms, ethoxylated alkanols having a degree of ethoxylation of from 4 to 30 and containing a $C_{12}$-$C_{18}$-alkyl radical and of ethoxylated alkylphenols having a degree of ethoxylation of from 4 to 30 and containing a $C_6$-$C_{12}$-alkyl radical and the alkali metal salts of alkanesulfonic acids of 12 to 18 carbon atoms.

Particularly suitable water-soluble polymerization initiators are peroxides, such as the alkali metal peroxydisulfates, hydrogen peroxide or combined systems which contain an organic reducing agent, a peroxide and a small amount of a metal compound which is soluble in the polymerization medium and whose metal component may occur in a plurality of valency states, for example ascorbic acid/iron(II) sulfate/sodium peroxydisulfate, the sodium salt of hydroxymethanesulfinic acid or sodium sulfite also frequently being used instead of ascorbic acid. The emulsion polymerization temperature and the amount of polymerization initiator used are known and are such that the resulting weight average molecular weight of the polymers A and B is from $10^5$ to $10^6$. As a rule, the emulsion polymerization temperature is from 30 to 90° C., preferably from 50° to 85° C., and the polymerization initiators are usually used in amounts of from 0.1 to 1.5% by weight, based on the monomers. The amount of emulsifier used essentially determines the mean diameter of the resulting dispersed polymer particles.

The light transmittance (LT value) of the aqueous polymer dispersion is a measure of the mean diameter of the dispersed polymer particles. In general, the polymers A and B are prepared in aqueous emulsion in such a way that the resulting starting dispersions, when diluted to a solids content of 0.01% by weight, have an LT value of from 30 to 95, measured using a commercial photometer at a wavelength of 0.546 μm and with a path length of 25 mm relative to water (which is assigned an LT value of 100). To obtain such starting dispersions, as a rule from 0.5 to 5% by weight, based on the amount of monomers, of emulsifiers E are used.

The preparation of aqueous starting dispersions containing the polymers C in disperse form is likewise known and can be carried out, for example, by the acetone process, the prepolymer mixing process, the melt dispersion process or the ketimine/ketazine process. These processes are described in, inter alia, DE-A 276 482, DE-A 14 95 745, DE-A 14 95 847, DE-A 26 45 779 and DE-A 26 51 506 and in Die Angewandte Makromolekulare Chemie 98 (1981), 133-165, Progress in Org. Coat. 9 (1981), 261-340 or J. Coat. Technol. 58 (1986) No. 738, 49-54.

The starting compounds I, P, S and, if required, K and N which are intended for the preparation of the polyurethanes C are used in amounts such that the ratio of the isocyanate groups to the groups reactive to isocyanate, for example hydroxyl and primary and secondary amino groups, is from 0.9 to 1.2, preferably from 0.98 to 1.05. If chain extenders K are present, the molar ratio of K to P is preferably less than 8, particularly preferably less than 6.

It is particularly advantageous to use the acetone process, in which a prepolymer having a terminal NCO group is prepared, for example in the melt, then dissolved in acetone and dispersed by adding water. Finally, the acetone is distilled off. As a rule, the starting dispersions containing the polymers A, B and C are prepared with a solids content of 20 to 60% by weight.

Suitable external plasticizers W include carboxylic esters, such as octyl hydroxybenzoates, eg. 2-ethylhexyl p-hydroxybenzoate, dicarboxylic esters, such as dioctyl adipates, the corresponding phthalic esters or phosphoric esters, such as tri-n-butyl phosphate. Of particular interest as external plasticizers are the octyl diphenyl phosphates and tributoxyethyl phosphate, since particularly good wet rub fastnesses are obtained in the surface coat of the leather when these compounds are used, preferably in amounts of from 4 to 8% by weight, based on the total amount of the polymers A, B and C, 2-ethylhexyl diphenyl phosphate being particularly preferred among these compounds.

Natural and synthetic waxes, such as carnauba wax, schellac wax, montan wax, paraffin wax, polyethylene wax, ester waxes and amide waxes, are suitable for modifying the novel aqueous formulations. Montan waxes are preferably used, in amounts of from 2 to 12% by weight, based on the total amount of the polymers A, B and C. The waxes are usually employed as aqueous emulsions. The novel formulations are advantageously prepared by stirring the external plasticizers W into the aqueous starting dispersion containing the polymer A and if necessary subsequently stirring the waxes and the aqueous starting dispersions containing the polymers B and C into the resulting mixture. If necessary, the mixture is finally diluted with water. Alternatively, other assistants conventionally used in leather coating technology may be added to the novel formulations. Examples of these include handle agents, such as fatty amide dispersions, thickeners, flow improvers, fillers, pigments, dyes, preservatives, antifoams, matt finish agents, crosslinking agents or casein.

The novel formulations are suitable as binders for coatings having high wet and dry rub fastness on leather or leather replacement materials and are preferably used for the final coat. Another noteworthy property of the coatings produced using the novel formulation is good fastness to hot plating, ie. the coating becomes neither matt nor dull and also does not smear when subjected to hot plating at up to 200° C.

Usually, the novel leather coating formulations are applied to the leather by casting, knife coating, spreading, printing, brushing or plush methods, but preferably by the spray method, if necessary in a plurality of layers, and are dried at from 60° to 90° C., in general a commercial bottoming coat being applied beforehand, usually in amounts of from 20 to 70 g of dry material per m$^2$, and being dried, as a rule, at from 50 to 80° C. Finally, plating is advantageously carried out on a continuous plating press at from 80° to 150° C. or on a hydraulic plating press at from 70° to 100° C. The amount of novel formulations applied is usually from 5 to 30 g of dry material per m$^2$.

EXAMPLES

Example 1

Preparation of various novel aqueous formulations Z1 to Z5

Z1 : 20 g of tributoxyethyl phosphate was stirred into 770 g of a 40% strength by weight aqueous starting dispersion I of a polymer A composed of
35% by weight of n-butyl acrylate,
30% by weight of styrene,
25% by weight of methyl methacrylate,
1.5% by weight of methylolmethacrylamide and
8.5% by weight of acrylic acid,
containing 1.5% by weight of the sodium salt of a sulfated ethoxylated alkylphenol ($C_8$-alkyl, degree of ethoxylation: 25) and 1.9% by weight of Na laurylsulfate, the percentages being based on A, and having an LT value of 92 in 0.01% strength by weight dilution.

Thereafter, 160 g of 50% strength by weight aqueous starting dispersion II of a polymer B composed of
70% by weight of n-butyl acrylate,
13% by weight of acrylonitrile,
13% by weight of styrene,
2% by weight of methacrylamide and
2% by weight of acrylic acid,
containing 1.9% by weight, based on B, of the sodium salt of a sulfated ethoxylated alkylphenol ($C_8$-alkyl, degree of ethoxylation: 25) and having an LT value of 60 in 0.01% strength by weight dilution, and 50 g of a 35% strength by weight wax emulsion based on montan ester, were added while stirring.

Z2: 30 g of 2-ethylhyexyl p-hydroxybenzoate were stirred into 800 g of a 40% strength by weight aqueous starting dispersion III of a polymer A composed of
55% by weight of methyl methacrylate,
43% by weight of ethyl acrylate and
2% by weight of acrylic acid,
containing 2% by weight, based on A, of the Na salt of a $C_{15}$-alkylsulfonic acid and having an LT value of 94 in 0.01% strength by weight dilution. Thereafter, 140 g of the aqueous starting dispersion II and 30 g of a 35% strength by weight wax emulsion based on montan ester were added while stirring.

Z3: 35 g of di-2-ethylhexyl adipate were stirred into 800 g of the aqueous starting dispersion III and thereafter 145 g of the aqueous starting dispersion II and 20 g of a 15% strength by weight aqueous colloidal casein solution, digested in an alkaline medium and modified with caprolactam, were added.

Z4: 25 g of 2-ethylhexyl diphenyl phosphate were stirred into 700 g of the aqueous starting dispersion III and thereafter 175 g of the aqueous starting dispersion II and 100 g of a 35% strength by weight wax emulsion based on montan ester were added.

Z5: 15 g of 2-ethylhexyl diphenyl phosphate were stirred into 600 g of the aqueous starting dispersion III and thereafter 125 g of the aqueous starting dispersion II and 160 g of a 40% strength by weight aqueous anionic polyurethane dispersion according to Example 1 of DE-A 26 45 779 and 100 g of a 35% strength by weight wax emulsion based on montan ester were added.

Example 2

Use Examples A1 to A4

A1: Full-grain cattle nappa leather was bottomed with a commercial formulation composed of
410 g of water,
80 g of casein-free pigment preparation (C.I. Pigment Black 7),
60 g of a dulling agent based on silica, 350 g of an aqueous dispersion according to Example 4 of EP=B 100 493,
50 g of an aqueous dispersion according to Example 1a4) of EP-B 100493 and
50 g of a 35% strength by weight wax emulsion based on montan ester
(two spray applications, drying at 70° C., plating in a hydraulic plating press at 80° C. and 20 bar, two further spray applications, drying at 70° C., total amount applied: about 50 g of dry material/m$^2$).

As a final coat, the formulation Z1 diluted to half concentration with water was then applied in an amount of about 25 g of dry material/m$^2$ in two spray applications with drying at 70° C. in each case and final plating at 110° C. in a continuous plating press.

The wet rub fastness according to IUF-450 was 700 rubbing cycles.

IUF = International Union Fastness, Standard of the International Fastness Commission for leather dyes and dyed leather.

In a comparative coating, formulation Z1 was replaced by the season dispersion according to Example 7 of EP-B 100493. The wet rub fastness according to IUF-450 was 80 rubbing cycles in this case.

A2: Full-grain chrome side leather was bottomed with a commercial formulation composed of 420 g of water, 100 g of casein-free pigment preparation (C.I. Pigment Black 7), 300 g of an aqueous dispersion according to Example 4 of EP-B 100 493, of EP-B 100 493, 50 g of a 35% strength wax emulsion based on montan ester and 10 g of the dye C.I. Acid Black 63 (liquid formulation) (one spray application, drying at 80° C., plating in a hydraulic plating press at 70° C. and 50 bar, one further spray application, drying at 80° C., total amount applied: about 40 g of dry material/m$^2$).

As a final coat (one spray application, drying at 80° C., one further spray application, drying at 80° C. and final plating at 130° C. in a continuous plating press), formulation Z4 diluted with water to half concentration was then applied in an amount of about 25 g of dry material/m$^2$.

The wet rub fastness according to IUF-450 was 2000 rubbing cycles.

The fastness to hot plating, according to VESLIC C 4580, 2nd edition, September 1979, test method of the Verein Schweizer Lederindustrie-Chemiker, was 190° C.

In a comparative coating, formulation Z4 was replaced by the season dispersion according to Example 7 of EP-B 100 493. The wet rub fastness according to IUF-450 was 100 rubbing cycles in this case.

A3: Sheep's leather was bottomed with a commercial formulation composed of 510 g of water, 60 g of casein-free pigment preparation (C.I. Pigment Black 7), 50 g of a dulling agent based on silica, 150 g of an aqueous dispersion according to Example 4 of EP-B 100 493, 150 g of an aqueous dispersion according to Example 1a4) of EP-B 100 493, 30 g of a wax emulsion based on montan ester 30 g of an aqueous fatty amide dispersion (8% strength by weight) and 20 g of the dye C.I. Acid Black 63 (liquid formulation) (two spray applications, drying at 50° C., plating at 70° C. in a plating press, two further spray applications, drying at 50° C., total amount applied: about 30 g of dry material/m$^2$).

As a final coat (two spray applications, each time with drying at 50° C., and final plating in a pressure plating press at 80° C./20 bar), a mixture of 500 g of Z4, 480 g of water and 20 g of an 8% strength by weight aqueous fatty amide dispersion was then applied in an amount of about 15 g of dry material/m$^2$.

The wet rub fastness according to IUF-450 was 400 rubbing cycles.

In a comparative coating, formulation Z4 was replaced by the season dispersion according to Example 7 of EP-B 100 493. The wet rub fastness according to IUF-450 was 65 rubbing cycles in this case.

A4: As for A2, except that Z4 was replaced by Z5.

The wet rub fastness according to IUF-450 was 1600 rubbing cycles.

We claim:

1. An aqueous polymer formulation containing
   a) from 5 to 60% by weight of one or more polymers consisting of
      A) from 50 to 100% by weight of one or more polymers A in polymerized form, composed of from 20 to 80% by weight of one or more esters of methacrylic acid with alkanols of 1 to 8 carbon atoms (monomers I), from 0.5 to 10% by weight of one or more $\alpha,\beta$-monoethylenically unsaturated carboxylic acids of 3 to 6 carbon atoms (monomers II) and from 10 to 75% by weight of one or more monomers from the group consisting of esters of acrylic acid with alkanols of 1 to 8 carbon atoms, acrylonitrile, acrylamide, methacrylamide, styrene and N-methylolmethacrylamide (monomers III),
      B) from 0 to 50% by weight of one or more polymers B in polymerized form, composed of from 30 to 98% by weight of one or more esters of acrylic acid with alkanols of 1 to 8 carbon atoms (monomers IV), from 1 to 8% by weight of one or more $\alpha,\beta$-monoethylenically unsaturated carboxylic acids of 3 to 6 carbon atoms (monomers V) and from 1 to 65% by weight of monomers from the group consisting of acrylonitrile, acrylamide, methacrylamide, styrene, vinyl chloride and vinyl acetate (monomers VI), and
      C) from 0 to 50% by weight of one or more polyurethanes C containing hydrophilic groups, with the proviso that the sum of B and C is from 15 to 50% by weight, based on the total amount of the polymer a),
   b) from 0.1 to 14% by weight, based on the total amount of the polymers A, B and C, of external plasticizers W,
   c) from 0 to 20% by weight, based on the total amount of polymers A, B and C, of natural and/or synthetic waxes,
   d) effective amounts of emulsifiers E and
   e) not less than 30% by weight of water.

2. An aqueous formulation as claimed in claim 1, which contains from 15 to 40% by weight, based on the total amount of polymer a), of polymers B and/or C.

3. An aqueous formulation as claimed in claim 1 or 2, which contains, as polyurethanes C, polyurethanes which contain from $0.5 \cdot 10^{-4}$ to $15 \cdot 10^{-4}$ gram equivalent of anionically ionized groups per gram of polyurethane in the polymer and from 0 to 10% by weight, based on the polyurethane, of ethylene oxide units arranged as terminal and/or side groups within ether chains.

4. An aqueous formulation as claimed in claim 1, which contains, as polymers A, polymers which contain from 40 to 65% by weight of methyl methacrylate and from 1 to 5% by weight of acrylic and/or methacrylic acid as polymerized units.

5. An aqueous formulation as claimed in claim 1, which contains octyl diphenyl phosphates and/or tributoxyethyl phosphate as external plasticizers W.

6. An aqueous formulation as claimed in claim 1, which contains from 4 to 8% by weight, based on the total amount of polymers A, B and C, of 2-ethylhexyl diphenyl phosphate as the external plasticizer W.

* * * * *